United States Patent

Bossen

[15] 3,655,980

[45] Apr. 11, 1972

[54] MEASURING WATER DRAINAGE RATE FROM WET STOCK FOURDRINIER SCREEN USING RADIATION SOURCE AND DETECTORS

[72] Inventor: David A. Bossen, Los Altos Hills, Calif.
[73] Assignee: Industrial Nucleonics Corporation
[22] Filed: June 20, 1968
[21] Appl. No.: 738,435

[52] U.S. Cl. .................. 250/83.3 D, 162/263, 250/43.5 D, 356/199, 356/201, 356/244
[51] Int. Cl. ....................................................G01t 1/16
[58] Field of Search ............. 250/83.3 D, 43.5 AD; 162/263; 356/199, 201, 244

[56] References Cited

UNITED STATES PATENTS 2,379,835  7/1945  Sisler ................................ 162/263
2,979,649  4/1961  Leighton ........................... 250/83.3 D
3,449,586  6/1969  Serra ................................. 250/219 F Primary Examiner—James W. Lawrence
Assistant Examiner—Morton J. Frome
Attorney—Cushman, Darby & Cushman, William T. Fryer, III, C. Henry Peterson and James J. O'Reilly

[57] ABSTRACT

In a Fourdrinier papermaking machine, the variation in the mass of the slurry along the length of the Fourdrinier travelling forming screen and the rate of water drainage therethrough are determined by a radioactive wire threaded along the length of the screen, or a plurality of radioactive sources successively disposed therealong, in conjunction with either a single radiation detector moved synchronously with the screen or a plurality of detectors monitored continuously or scanned synchronously with the screen movement.

15 Claims, 4 Drawing Figures

INVENTOR
DAVID A. BOSSEN

Patented April 11, 1972

INVENTOR
DAVID A. BOSSEN

BY Cushman, Darby & Cushman
ATTORNEYS

MEASURING WATER DRAINAGE RATE FROM WET STOCK FOURDRINIER SCREEN USING RADIATION SOURCE AND DETECTORS

PREAMBLE

This invention relates to the measurement of mass or weight per unit area of wet stock or fiber slurry along the stock carrying length of a Fourdrinier wire or screen and to the determination of the rate of water drainage through the screen while it moves in a downstream direction.

Fiber slurry as it passes through a slice lip from a headbox on to a Fourdrinier screen is approximately 99.5 percent water. At the end of the screen, near the couch roll, the amount of water remaining is generally in the area of 84 percent. As the screen moves the slurry in a downstream direction, over the conventional table rolls and suction boxes, water is drained through the screen and the remaining stock is gradually made into a fiber mat. Conventionally, the screen is constructed similar to a grid-like sieve of 60–100 mesh, for example, being made of any one of various materials including copper, stainless steel, and more recently, plastic. The stock carrying length of the screen or "wire," as it is frequently termed, may be about 60 feet. During this length, a considerable amount of water is drained through the screen, and in order to improve the paper product being made, it is desirable to know the amount of water drainage along the length of the screen.

It is a primary object of this invention to improve man's knowledge of the operation of Fourdrinier papermaking machines, particularly in the area of the Fourdrinier screen, as to the mass variation of the fiber slurry as it moves downstream on the screen. It is a further object of this invention to determine the rate of water drainage through the Fourdrinier screen along its stock carrying length.

These objects are generally accomplished by using radioactive source and detector means on opposite sides of the slurry on the screen along the length thereof. Various embodiments are disclosed. In one embodiment, separate radioactive sources are disposed underneath the screen, between the table rolls and suction boxes, to form the radioactive means, while in another embodiment, a radioactive wire is threaded along the length of the Foudrinier screen. With either arrangement, the detector means can be in the form of a single detector which is moved synchronously downstream with the screen and readout continuously on an indicating means such as a recorder. Alternatively, the detector means may be a plurality of separate detectors spaced over the screen along the radioactive source means, and these detectors may be monitored continuously by respective meters or their outputs may be scanned sequentially in a downstream direction and applied to a recorder. In any case, the detector or detectors measure the mass or weight per unit area of the fiber slurry or wet stock on the screen beneath them, and this measurement may be indicated in terms of the rate of water drained through the screen along its stock carrying length.

The foregoing objects and embodiments of this invention will become more apparent from the following detailed description of the invention, in conjunction with the attached drawings, in which:

FIG. 1 is a diagrammatic representation of a portion of the wet end of a Fourdrinier papermaking machine illustrating an embodiment of the invention in which separate radioactive sources and detectors are paired on opposite sides of the screen along its stock carrying length;

FIG. 2 diagrammatically illustrates another embodiment of the invention in which the radioactive detectors are monitored continuously;

FIG. 3 illustrates a portion of a Fourdrinier wire or screen with a radioactive wire threaded therein in the lengthwise direction of the screen; and FIG. 4 illustrates another embodiment of the invention using the radioactive wire screen of FIG. 3.

DETAILED DESCRIPTION

Figure 1:
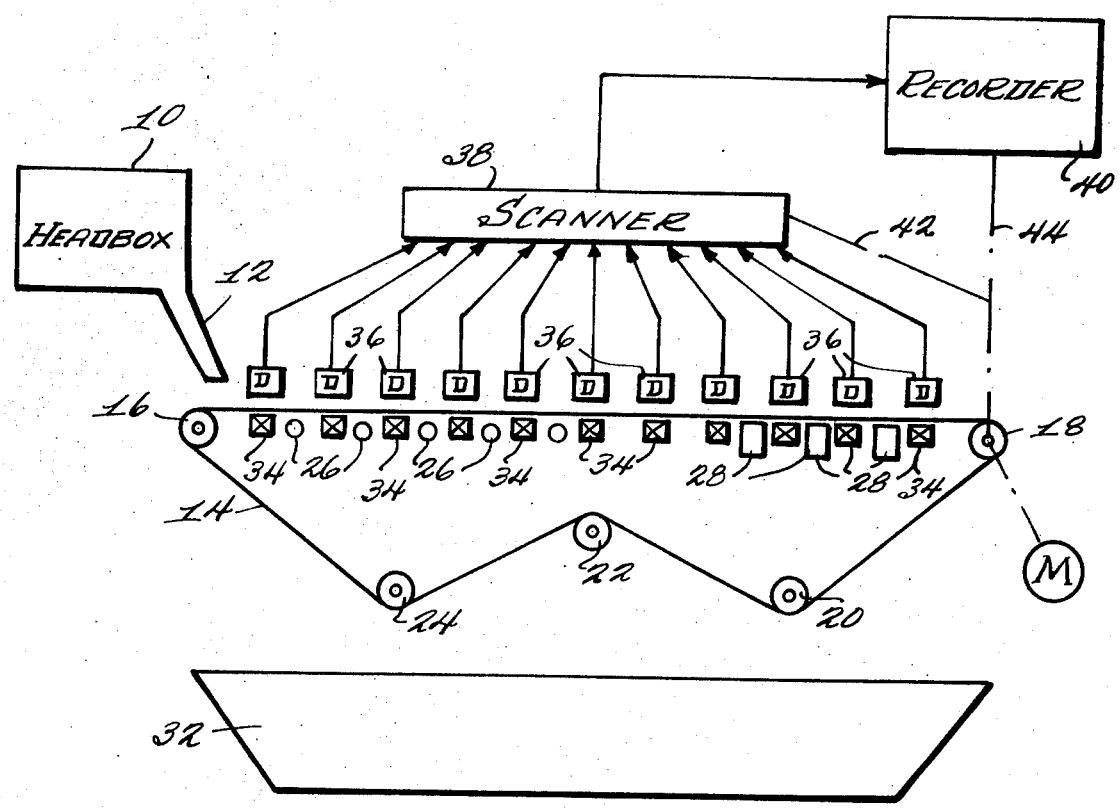

FIG. 1 shows an embodiment of the invention in the wet end of a conventional Fourdrinier papermaking machine. In particular, a conventional headbox 10 contains the fiber slurry or wet stock which is introduced through a conventional slice lip 12 onto a regular Fourdrinier wire or screen 14 trained around breast roll 16 and couch roll 18. Screen 14 is an endless loop which extends past further rollers 20, 22, and 24 in conventional fashion, and is supported in the normal way by table rollers 26. Towards its downstream end are conventional suction boxes 28. As the fiber slurry is introduced onto screen 14, the screen is moved downstream, i.e., rightwardly, in FIG. 1, by conventional means such as motor 30, driving couch roll 18, and the slurry looses water as it progresses downstream with the screen. This water, sometimes referred to as white water, is drained from the slurry through screen 14, and is caught in a white water pit 32 from which the water may be reused in conventional manner, as desired.

In accordance with one embodiment of the present invention, a plurality of radioactive sources 34 are placed on one side of screen 14, for example underneath the screen, between successive table rolls 26 and between the suction boxes 28 as shown. Paired with the sources on the opposite side of screen 14 are respective radiation detectors 36, which measure the mass or weight per unit area of the wet stock or slurry which is in between each paired source and detector.

Each of the detectors 36 is connected to a scanner 38, which connects the detectors sequentially, in a downstream direction, to recorder 40, which may be of the chart and pen type for example. Preferably, the scanner and recorder are synchronized with the speed of screen 14, as indicated by lines 42 and 44, so that each detector "looks" at the same slurry in its downstream travel and the recorder makes, for example, a graph of slurry weight per unit area versus time or downstream distances. Such a graph is preferably calibrated in terms of rate of water drainage through the wire along its stock carrying length. That is, since each source detector pair measures the total weight per unit area of the slurry at a given point on the screen, not only the amount of fiber stock per se but also the amount of water at that point is measured. And since the amount of fiber stock remains substantially constant from one end of the screen to the other, then any difference between the reading of successive downstream detectors is a measure of the amount of water drained through the screen during its downstream movement between those detectors. Accordingly, the rate of water flow through the screen as it moves away from the slice 12 towards couch roll 18 is indicated by recorder 40.

Figure 2:
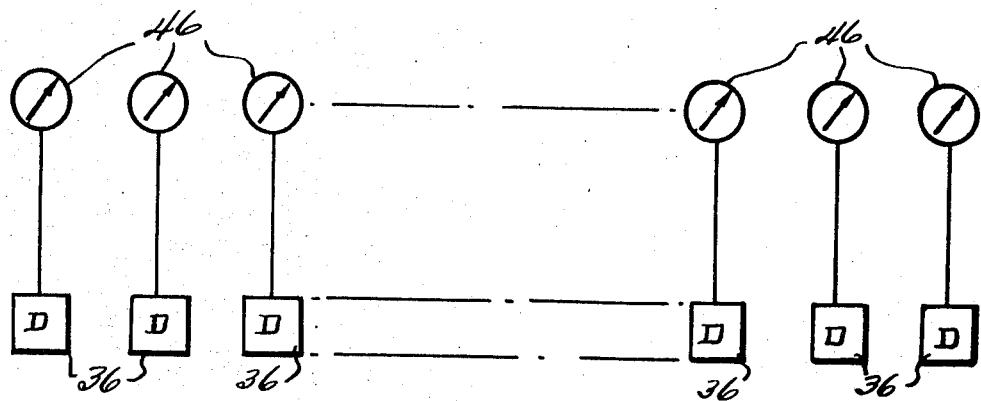

The rate of water drainage through screen 14 may also be indicated by respective gauges or meters 46 which are continuously connected to the detectors 36, as shown in FIG. 2, to monitor the outputs thereof. From a visual inspection of meters 46, it can be determined how much water drainage is taking place at various points along the travel of screen 14, so as to indicate the drainage rate through the screen along its length.

Figure 3:
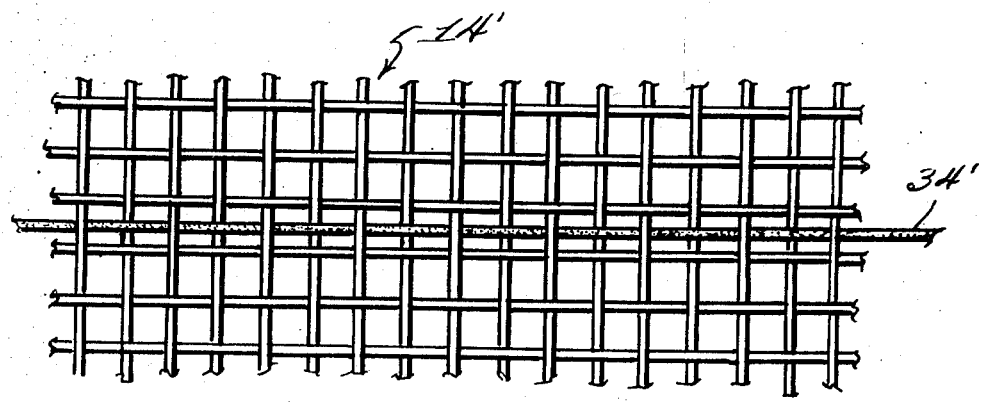

Instead of using separate radioactive sources 34 spaced along the stock carrying length of screen 14, that screen may have a radioactive wire 34' (FIG. 3) threaded along the length of the screen, at a point, for example, midway between opposite edges of the screen. The resulting screen 14' is used in the system shown in FIG. 4.

Figure 4:
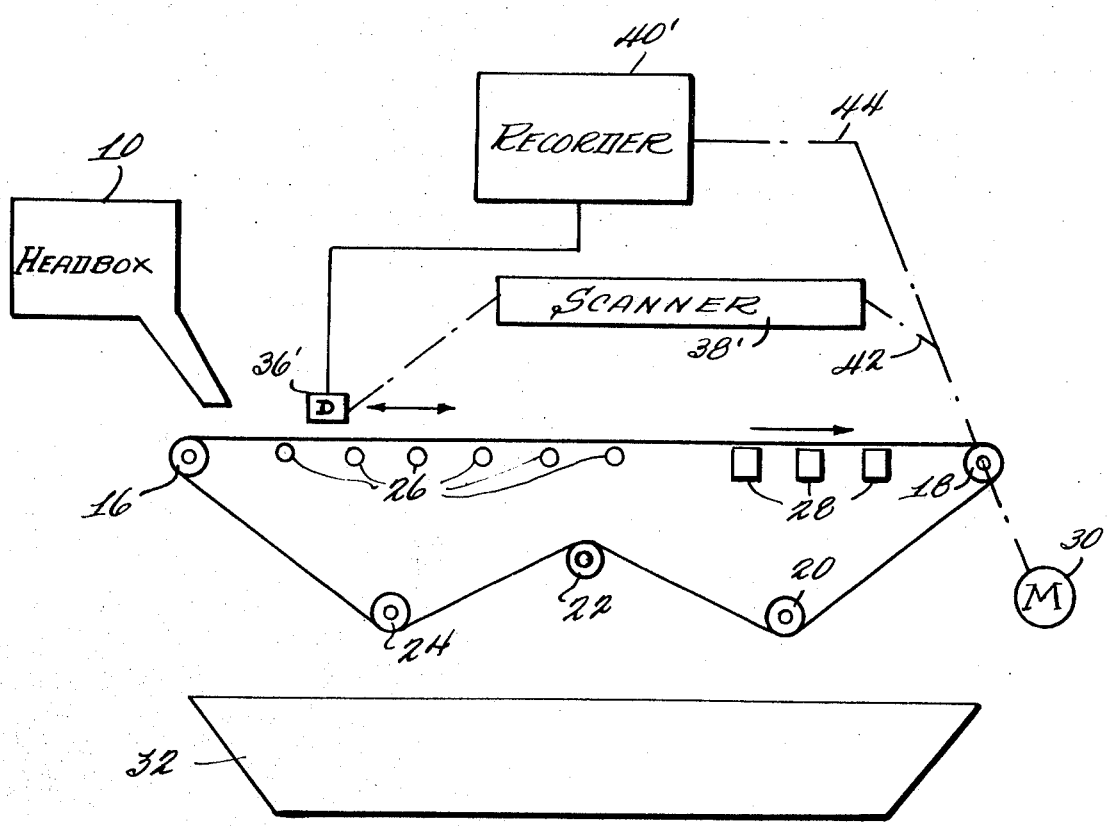

With screen 14' having a radioactive thread 34', the separate radioactive sources 34 of FIG. 1 are no longer needed in the embodiment shown in FIG. 4. A plurality of detectors 36, as in either FIG. 1 or 2, may be employed in the radioactive wire embodiment of FIG. 4 in the manner described above, or a single detector 36' may be employed instead. Detector 36' is moved in a downstream direction over the radioactive wire 34' by a scanner 38'. This movement of detector 36' is preferably synchronized with the speed of screen 14' as shown, so that the detector "sees" the same fiber slurry throughout its travel downstream, as the water is drained therefrom through the screen. The output of detector 36' is therefore a measure of the mass or weight per unit area of the slurry as it moves downstream, and this output is applied to recorder 40' to provide an indication of the slurry weight per unit area versus time or distance, or an indication of the rate of water drainage through the screen throughout its stock carrying length, as discussed above. The graph which recorder 40' makes may be a continuous graph, while the graph of recorder 40 in FIG. 1 may be a discontinuous or broken graph, a discontinuity being effected each time the scanner changes from one detector output to the next. Dot recording may also be employed if desired. The scanning in FIGS. 1 and 4 is preferably cyclic, but neither recorder need be operative during retrace by the respective scanner back to the upstream starting position adjacent breast roll 16.

From the foregoing, it is apparent that the described embodiments of this invention fully carry out the objects of determining the variation of weight per unit area of the slurry along the stock carrying length of the Foudrinier screen, from which the rate of water drainage through that screen can be indicated. Other embodiments of this invention fully carry out the objects of determining the variation of weight per unit area of the slurry along the stock carrying length of the Fourdrinier screen, from which the rate of water drainage through that screen can be indicated. Other embodiments of this invention will become apparent to those of ordinary skill in the art after reading the foregoing embodiment thereof, but it is to be understood that these detailed embodiments are exemplary and not limitative, the invention being defined by the following claims.

What is claimed is:

1. In a papermaking machine of the type having a traveling forming screen which receives and carries wet stock in the downstream direction and through which water is drained along its stock carrying length, the improvement comprising:
   radiation source means and associated detector means disposed adjacent said stock as it is carried by said screen for measuring the stock mass along the said screen length, and
   means responsive to said detector means for determining the water drainage rate through the screen along its said length.

2. Apparatus as in claim 1 wherein said detector means provides a plurality of outputs at spaced points along said screen length and said drainage rate determining means monitors said outputs continuously.

3. Apparatus as in claim 1 wherein said detector means provides a plurality of outputs at spaced points along said screen length and said drainage rate determining means scans said outputs serially.

4. Apparatus as in claim 3 wherein said determining means scans said outputs synchronously with the travel speed of said forming screen.

5. Apparatus as in claim 1 wherein said radiation detector means comprises a detector which is movable in said downstream direction at a speed synchronized with the travel speed of said forming screen.

6. Apparatus as in claim 1 wherein said radiation detector means comprises a plurality of radiation detectors disposed at spaced points along the said length of said screen.

7. Apparatus as in claim 6 wherein said radiation source means comprises a plurality of radiation sources disposed at said spaced points along the said screen length respectively for said detectors, the sources being located on one side of the wire and the detectors on the other.

8. Apparatus as in claim 7 wherein said drainage rate determining means includes means for continuously monitoring each detector output.

9. Apparatus as in claim 7 wherein said drainage rate determining means includes means for scanning the detector outputs serially.

10. Apparatus as in claim 1 wherein said radiation source means comprises a radioactive wire threadedly extending in said forming screen along the said length thereof.

11. Apparatus as in claim 10 wherein said radiation detector means comprises a single detector which is movable in said downstream direction at a speed synchronized with the travel speed of said forming screen.

12. Apparatus as in claim 10 wherein said detector means comprises a plurality of radiation detectors disposed at spaced points along said wire length.

13. Apparatus as in claim 12 wherein said drainage rate determining means includes means for scanning the detector outputs synchronously with the travel speed of said forming screen.

14. Apparatus as in claim 1 wherein said radiation source and detector means are disposed so as to be on opposite sides of the said wet stock as it is carried downstream by said screen.

15. A method for determining the water drainage rate from wet stock on a travelling forming screen in a papermaking machine comprising the steps of
   detecting with a radiation source and associated detector means, the weight per unit area of said stock as it travels with said forming screen, and
   using the weight per unit area resulting therefrom at least at successive points in said travel to indicate the rate of water drainage through said screen.

* * * * *